Dec. 24, 1963

P. L. FOX 3,114,979

SYNTHETIC PROJECTION

Filed May 15, 1959

INVENTOR.
PAUL L. FOX
BY Angus & Mon
ATTORNEYS.

Dec. 24, 1963    P. L. FOX    3,114,979
SYNTHETIC PROJECTION
Filed May 15, 1959    5 Sheets-Sheet 2

INVENTOR.
PAUL L. FOX
BY Angus & Mau
ATTORNEYS.

Dec. 24, 1963  P. L. FOX  3,114,979
SYNTHETIC PROJECTION
Filed May 15, 1959  5 Sheets-Sheet 4

INVENTOR.
PAUL L. FOX
BY Angus & Mon
ATTORNEYS.

Dec. 24, 1963 P. L. FOX 3,114,979
SYNTHETIC PROJECTION
Filed May 15, 1959 5 Sheets-Sheet 5
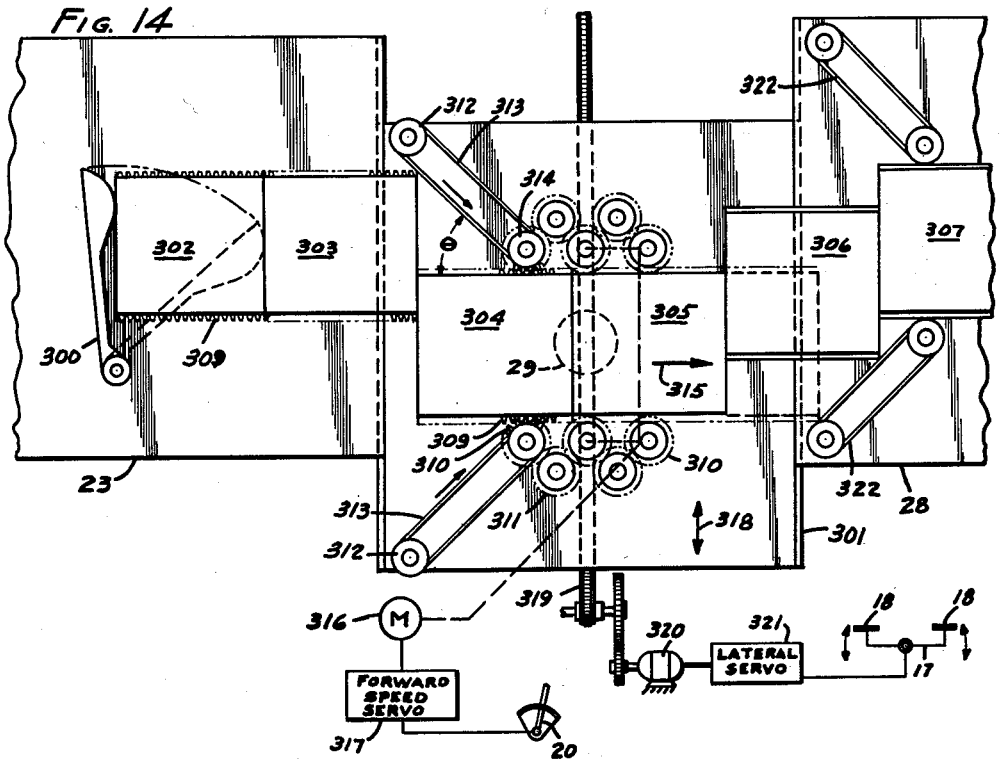
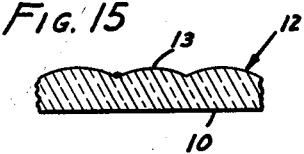
INVENTOR.
PAUL L. FOX
BY Angus & Mon
ATTORNEYS.

United States Patent Office 3,114,979
Patented Dec. 24, 1963

3,114,979
SYNTHETIC PROJECTION
Paul L. Fox, Whittier, Calif., assignor to Rheem Manufacturing Company, Inc., Downey, Calif., a corporation of California
Filed May 15, 1959, Ser. No. 813,488
5 Claims. (Cl. 35—12)

This invention relates to a visual display device and to an image storage means for such a device.

An object of this invention is to provide an observer with a scenic display whose aspect changes with his simulated position in space relative to a scene, both as to altitude, attitude, and relative motion. An additional object is to provide the scenic display in an unprogrammed manner, so that the device can be utilized for such purposes as an aircraft landing trainer. A requirement for an ideal trainer of this type is that the device be capable of faithfully representing an observer's position in space relative to a scene over a wide and continuous range of possible positions. Heretofore, this requirement has not been met.

There are two primary requisites in such a requirement. A first is that the presentation must be unprogrammed in the sense that data is stored in the system for all possible observer positions relative to the scene, so that the aspect of the scene at a given observer location may be selected at will, and this aspect will be a true view of the scene from any selected point within a wide range of positions in which every element of the scene is in its proper relative perspective and position. The display system is thus distinguished from a programmed display wherein data is provided for only a single unique sequential set of positions. In this type of programmed display, even though the scene may be shifted from side to side, still the relief objects, and their shadows, respective proportions and positions, will be that which would be seen from another point and therefore will appear unrealistic. For example, this can result in a total reversal of the position of a pair of adjacent articles, if the observer's simulated position were to the left of two items which were photographed from the right. A second requisite is that the system provide a wide-angle presentation, preferably extending from horizon to horizon, so as to give an effective illusion of "presence" of the observer relative to the scene, rather than a small-angle "peephole" type of presentation.

It is well known that programmed presentations are not particularly effective for training devices. This is because they do not provide a unique aspect of the scene for each and every possible simulated position which an observer may assume in space relative to the scene. Instead, conventional program techniques ordinarily involve the preparation of a single film strip, which is taken along some predetermined and optimum path. This is all that can be portrayed, because this is all the data which the system stores. When the strip is projected in the training device, the observer sees only the single path, and any deviations in his position from the ideal path are not realistically portrayed to him. This is because the picture which is viewed is that which is taken from the programmed path, and is not the picture which would be viewed from the simulated position in space relative to a scene actually occupied by the person in the trainer.

In order to overcome this inherent limitation of programmed-type devices, attempts have been made to provide a larger supply of data, such as by the use of many film strips or film plates. However, it will be noted that only one set of data can be obtained from each film strip or plate, and each corresponds only to one unique position or path in space. Programmed displays therefore suffer from the fact that they can store very little data, and can give realistic reproductions of the scene only at those few locations for which data is stored. Attempts to provide more data involves a multiplication of physical data storage devices, each for the same purpose. Then the task of selecting the data to be shown, along with the shear bulk of the equipment, is prohibitive, and effectively bars the use of programmed displays with reasonable selection of data for practical visual display systems.

To overcome the limitations of programmed displays, various analogue-type systems have been proposed. Analogue systems generally involve the construction of a model representing a scene, and the scanning of the model by an optical system, which projects an image of the model upon a screen. The image can be projected on the screen in the aspect of the model which would be viewed by an observer in that relative location. Because the projector device can be moved anywhere over the model, a completely unprogrammed device can be prepared.

While an unprogrammed display is obtainable from an analogue system working from an original model, there are inherent in such systems so many practical problems that they are really not practical.

A principal disadvantage of analogue systems resides in the model which is required for their use. One model needs to be prepared for each scene to be presented, and this model must actually be physically present whenever the device is to be used. This raises considerable problems, not the least of which is storage of the models. If an adequate field of view is to be projected on a screen, then a large and cumbersome model must be provided. Such a model takes up considerable building space and still provides for a display of only one scene.

If the model is made smaller in an effort to take up less storage space, then, if the same field of view is to be provided, the relief components of the model become very small and fragile. As the model scale ratio becomes larger, the expense of creating the fine detail rises rapidly, and ultimately may become an extremely expensive engraving job. Thus, the model cost, including that of construction, use, storage, and maintenance, is prohibitive.

In addition, both large and small models for analogue systems involve expensive auxiliary equipment. The large models require bulky and expensive driving servos, and the small models require high intensity illumination, condensers, and bulky cooling apparatus in order to provide the light required for adequate magnification.

In view of the above complications, it appears most unlikely that a completely satisfactory programmed system or unprogrammed analogue system can ever be built.

This invention provides an unprogrammed, scenic display without any of the above limitations by taking a completely new approach toward data storage. The device for providing the display requires a minimum of storage area, and image data relating to a large number of scenes can be stored in a small fraction of the space required for a single model of the analogue type. Furthermore, this device can produce a completely unprogrammed scenic display, so that simulated positions within the operating range of the device may be selected at random, still providing an aspect of the scene unique to the randomly selected position.

A feature of the invention resides in image storage means which comprise plates that bear a plurality of lens elements on one of their sides, and a plurality of respective image storage elements on the opposite side. The image storage elements are originally sensitized, and are exposed, one by one, to a different aspect of the scene to be reproduced. The image storage elements are then developed, and thus retain the data (scene aspect) to which they were exposed. Thereafter, when illuminated, each image storage element yields rays which tend to return toward their original orientation in space relative to the plates, and there they reconstitute an image which for all purposes in this invention can be substituted for a model in an analogue system. This image is projected onto a screen where it is viewed by a person occupying the training device.

An entire scene can be stored upon a reasonable number of plates, and the plates can be handled sequentially under a projector device for projection to be viewed by the user of the trainer, so that scenes of practically unlimited length and breadth can be reconstituted.

The above and other features of this invention will be fully understood from the following detailed description and the accompanying drawings, in which:

FIG. 14 is a plan view of a plate handling device used in the invention; and

FIG. 15 is a cross-section of a screen surface useful in this invention.

Figure 1:
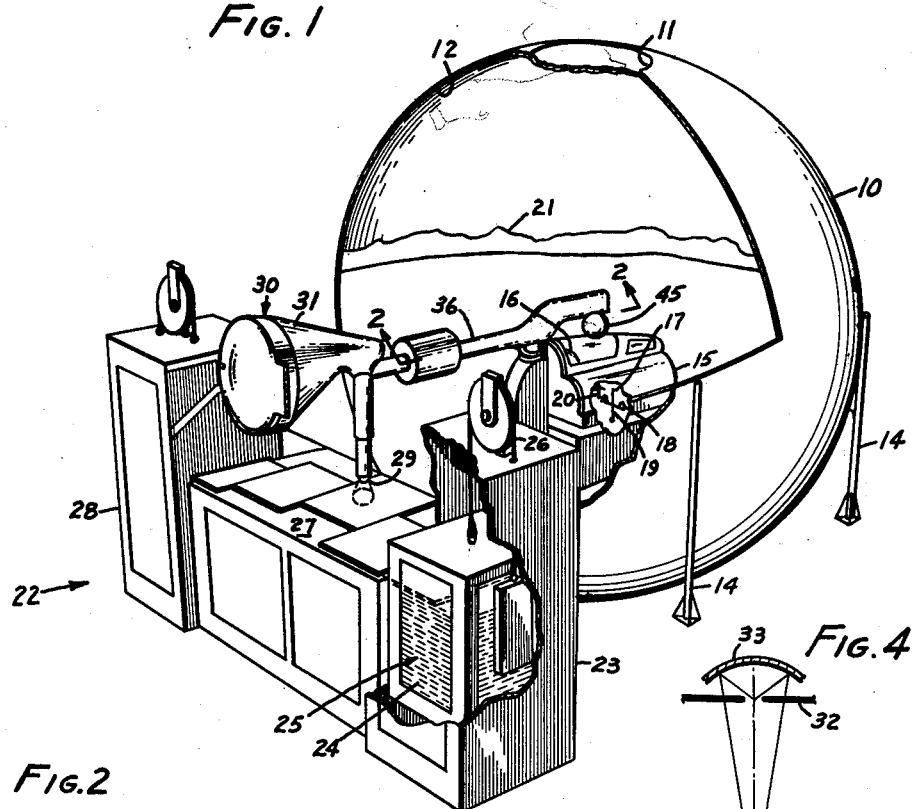
FIG. 1 is a perspective view, partly in cutaway cross-section, showing a trainer which incorporates the optical system according to the invention.

FIG. 1 shows a trainer incorporating the optical system according to the invention. There is a spherical screen enclosure 10 which has a vent port 11 at the top thereof, and which has an interior screen surface 12 which is covered by screen elements 13 shown in FIG. 15. Each screen element is a convex surface, and these are nested together so that they intersect to have hexagonal boundaries. Support posts 14 are fixed to the outside of the enclosure to hold it up.

Within the enclosure there is a pilot capsule 15 which simulates the cockpit of a jet aircraft. The head 16 of the trainee can be seen beneath the canopy. A conventional rudder bar 17 and pedals 18 are provided to control the system to simulate heading changes. A universally pivoted control stick 19 is provided to control the system to simulate pitch and roll. A throttle 20 controls the system to simulate a velocity relative to a scene. Scene 21 is projected onto the screen. It is the purpose of this trainer to make this scene an accurate simulation of the surroundings, and of the pilot's position, attitude and velocity relative to it.

A data storage system 22 is placed adjacent to enclosure 10. A first storage cabinet 23 encloses a lift 24 which contains a stack of image storage plates 25. Lift 24 is biased so that it tends to move upwardly. The means for causing this movement are schematically illustrated by a rope and pulley system 26, although it will be understood that other means for moving the lift vertically may be used instead.

Plates 25 are shifted across a table 27 by a mechanism which is shown in detail in FIG. 14. The plates, after passing across the table, are received in a second lift (not shown) in second storage cabinet 28.

As the plates pass between the two storage cabinets, they pass beneath the objective lens 29 of the optical system of the invention. The objective lens is entirely conventional, and need not be discussed in detail here. The objective lens is disposed directly above a location on the plate which corresponds to the location of the observer in the system. The image formed from the plates by the objective lens and projected onto surface 12 will change in aspect as the plates move beneath the objective lens.

Figure 4:
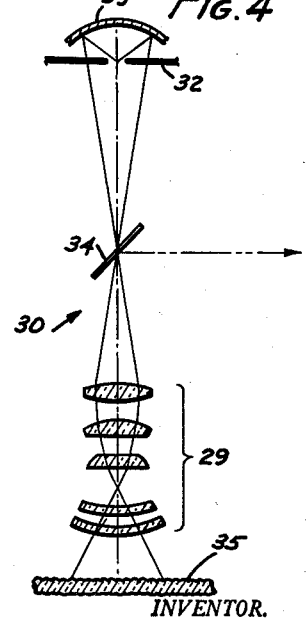
FIG. 4 is a side elevation of a means for providing illumination in the optical system of this invention.

A light source 30 which is shown in full detail in FIG. 4, is disposed in a housing 31. An arc 32 or other source of illumination, is reflected by a reflector 33 to a semi-reflecting mirror 34, which reflects a portion of the light incident thereon to the left in FIG. 4. This light is lost to the system. The remainder of the light, usually about half, is transmitted by the mirror and the objective lens 29 from which it impinges on an image storage plate 35. It will shortly be shown that this illumination causes an image of a scene to be formed by the objective lens. This image is passed to semi-reflecting mirror 34, part of which is transmitted and lost to the system, and the other part of which is reflected to the right in FIG. 4. This is into tube 36 in FIG. 1.

Figure 2:
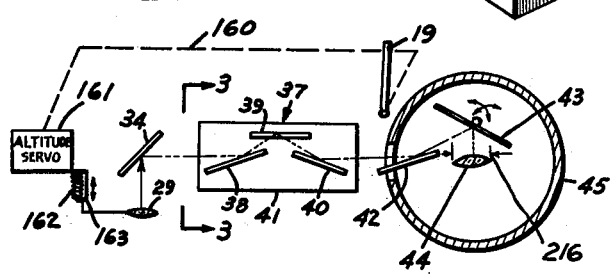
FIG. 2 is a schematic view taken at line 2—2 of FIG. 1.
Figure 3:
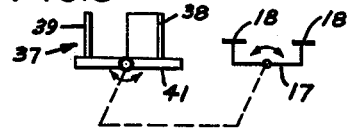
FIG. 3 is a fragmentary view taken at line 3—3 of FIG. 2.

The details of the elements in tube 36 are best shown in FIGS. 2 and 3. In FIG. 2, semi-reflecting mirror 34 is shown reflecting its light to a K mirror 37. The K mirror comprises three mirrors 38, 39, 40 mounted to a pivoted base 41. The K mirror has the property of rotating an image impinging thereon, without deviating or deflecting it. This is the means by which the image is actually caused to be displayed on the screen so as to indicate heading. In order for the system to respond to a change in heading desired by the trainee, pivoted base 41 is linked to the rudder bar. Pivoting of the rudder bar will cause rotation of the K mirror and will rotate the image around the horizon. The K mirror is merely a single example of an image-rotating means suitable for heading simulation. Other image-rotating means, such as Porro prisms, may be substituted for the K mirror, if desired.

Rays from the K mirror impinge on another mirror 42 (which may be substituted for by a prism, if preferred), that reflects the rays to an attitude-control mirror 43. Mirror 43 is universally mounted so as to be tiltable around the forward and lateral horizontal axis relative to the trainee. Tilting around the forward axis raises and lowers the image at the sides of the trainee to simulate roll. Tilting around the lateral axis raises and lowers the image ahead of the trainee to simulate pitch.

Roll and pitch are principally controlled by the control stick in an airplane. Therefore, attitude control mirror 43, which is universally mounted, is linked to the universally mounted control stick 19. Appropriate linkage may be provided so that the change in attitude simulated by the trainer is realistically proportional to that which is obtained by a given control stick movement.

A projection lens 44 receives rays from mirror 43. The projection lens is disposed inside a Fresnel lens 45 which is generally spherical, and is for the purpose of compensating for parallax. Parallax occurs because the projection lens is disposed at a distance from the trainee. The Fresnel lens compensates for this inherent error, so that the scene on the screen accurately represents what the trainee would see from his cockpit in an actual aircraft.

The image storage means which lies at the heart of the invention will first be explained with reference to FIG. 5 which shows a single data storage element, called cell 50 for convenience. This cell has a lens element 51 that is a segment of a sphere of radius $r$, which acts as a lens to focus rays 52 of light entering into it on a back surface which acts as an image storage element, and is hereinafter called an "image storage element" 53. The image storage element has the same center of curvature as the lens, but has a radius R which is so chosen that $r+R$ equals the focal length of the lens.

This cell is in effect a miniature camera, and if it is so used, it can be made to produce a permanent picture on the image storage element in the form of a transparency if the image storage element surface is sensitized, exposed, and developed. The action of any lens or lens combination, including that of the cell illustrated, is reciprocal between real image points. Therefore, if during a photographing operation, a real object in space forms a real image on the image storage element, then if the image storage element is back-illuminated, its image will be projected into the space relative to the cell where the object was originally located.

Figure 5:
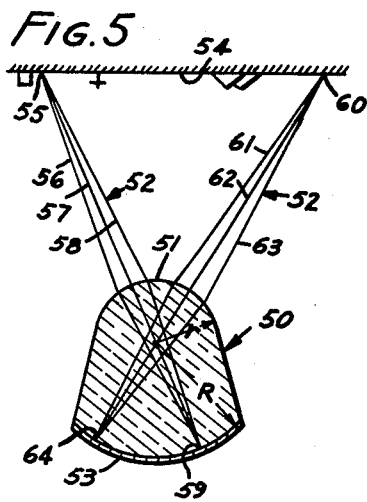
FIG. 5 is a side elevation, partly in cross-section, showing a data storage cell used in this invention.

Thus, with reference to FIG. 5, an object in an object plane 54, such as an object at point 55, will have its emitted rays, of which rays 56, 57, 58 are examples, focused on the image storage element surface at point 59. Another object at point 60 which emits rays, of which rays 61, 62, 63 are examples, will have its rays focused at another point 64 on the image storage element surface. Rays 56–58 and 61–63 are simply three exemplary rays from each of two points in the object plane, which serve to illustrate that the emitted rays from individual points in the object plane are focused upon unique and corresponding points on the image storage element surface.

When the image storage element surface is back-illuminated, the rays from the image storage element surface will go in the opposite direction to form a real image at the point in space relative to the cell where the object was before. Such a cell thereby becomes a unit which stores data relating to the scene in the object plane, and from which the stored data can be taken.

Of course, the image in space cannot be observed directly, because the bundles of rays which form the image points are very narrow, and the pupil of the eye is able to intercept only a tiny fraction of the total set of such bundles. However, the usual technique of placing a diffusing screen at the image position, that is, at a location in space relative to the cell corresponding to object plane 54, would render the image visible.

Figure 6:
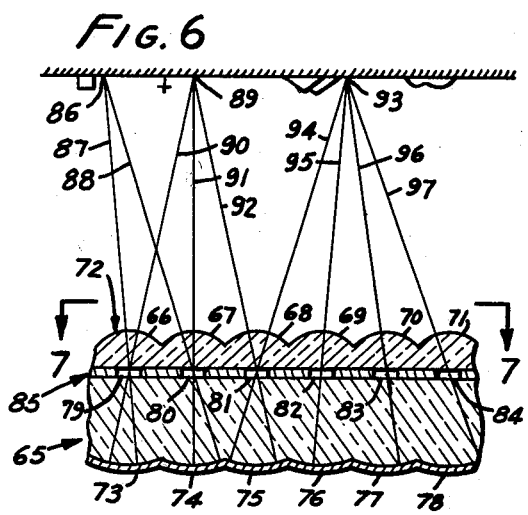
FIG. 6 is a side elevation, partly in cross-section, showing an image storage plate according to the invention, and illustrating certain of its characteristics.
Figure 7:
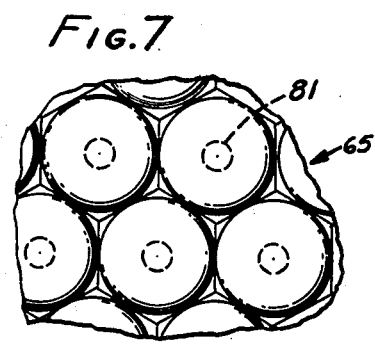
FIG. 7 is a plan view taken at line 7—7 of FIG. 6.

FIG. 6 shows a plate 65 made of transparent material which is studded with and is substantially completely covered by a plurality of convex lens elements of which elements 66, 67, 68, 69, 70 and 71 are particularly shown. These lens elements are identical to lens surface 51 of FIG. 5. As shown in FIG. 7, the lens elements are placed in a staggered pattern, forming hexagonal boundaries on the individual lens surfaces. Every portion of the upper surface 72 of the plate incorporates some part of a lens element. On the other side of the plate from the lens elements there is a plurality of image storage elements 73, 74, 75, 76, 77, and 78. It will be seen that each lens element has a respective image storage element in axial alignment with it. Directly between each two respective elements there is an aperture 79, 80, 81, 82, 83, and 84. These apertures are circular holes in an opaque aperture plate 85. The respective positions of the apertures in the plate relative to their lens and image storage elements can best be seen in FIG. 7.

With an unspecified number of cells of the type disclosed in FIG. 5 assembled into the plate of FIG. 6 as shown, it will be seen that the various apertures will limit the "field of view" of the individual cells. This is necessary so that the light from one lens element will not go to any image storage element except its own corresponding image storage element.

In FIG. 6, two exemplary rays 87, 88 are shown emitted from a point 86. These selected rays are principal rays for the respective cells upon which they impinge. They impinge upon and form an image on image storage elements 73 and 74, respectively. From point 89 there are shown three exemplary rays 90, 91, 92 which impinge upon and form an image upon image storage elements 73, 74, and 75, respectively. A third point 93 is shown emitting four exemplary rays 94, 95, 96, 97 which respectively fall upon image storage elements 75, 76, 77, and 78. Of course, all object points between the selected one also emit rays, so that the entire object scene is "scanned" by the cells of the plate.

It will be observed that one each of the cells there will be a complete picture of the field of view of that particular cell. Thus, if the image storage elements were back-illuminated, the light emitting therefrom would be refocused in the object plane so as to reconstitute the image. It will be observed that each cell emits rays to reproduce the image which it carries in the exact space relative to the plate where the original scene existed. Since all cells looked at the same scene, they can jointly reproduce only one scene, the original. In other words, all corresponding image points from the various cells will be coincident. Due to optical aberrations in the system, the statement is only approximately true, but the approximation is sufficiently good that a useful effect is realized.

The difference between the image formed by a single cell, such as shown in FIG. 5, and that formed by a plate constituted of such cells, as shown in FIG. 6, is that instead of each image point being formed by a narrow bundle of rays travelling in a single direction, the same image point is formed by rays converging from all directions.

It will now be shown that the type of image reconstituted by one of these back-illuminated plates can, for all purposes of this invention, be substituted for the original object as the source of a projected image. That is to say, the plate as a data storage device is a complete substitute for the model (or other scene, which could even be natural terrain) to which it was exposed. At this point attention is called to the fact that when the images are formed on these plates, each cell "sees" a different aspect of the model. This is to say, the scene in the object plane (the model) is seen by each lens element in a different aspect, because each lens element is located at a different lateral position relative to the scene. Inasmuch as it is very difficult to accurately control the exposure of all cells at one time, it is presently preferred to expose a single one of said cells at a time, for example, by moving a camera system between the plate and the object plane, stopping the camera directly over each individual cell, and at that time exposing the sensitized image storage element of the selected cell, and then moving the camera along to the next and successive cells. Each cell then has an image corresponding to the model seen at that point in space relative to the model.

Figure 9:
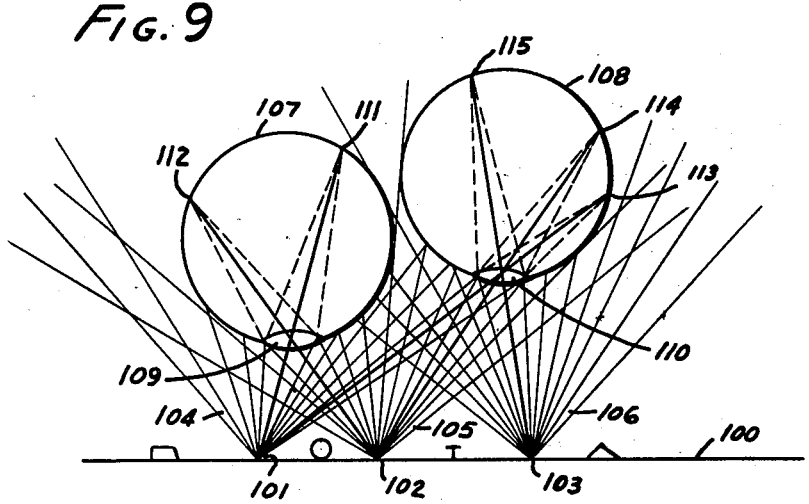
FIGS. 9 and 10 illustrate the formation of images by an eye in the radiation field of a natural object field and of a plate such as shown in FIG. 6, respectively.
Figure 10:
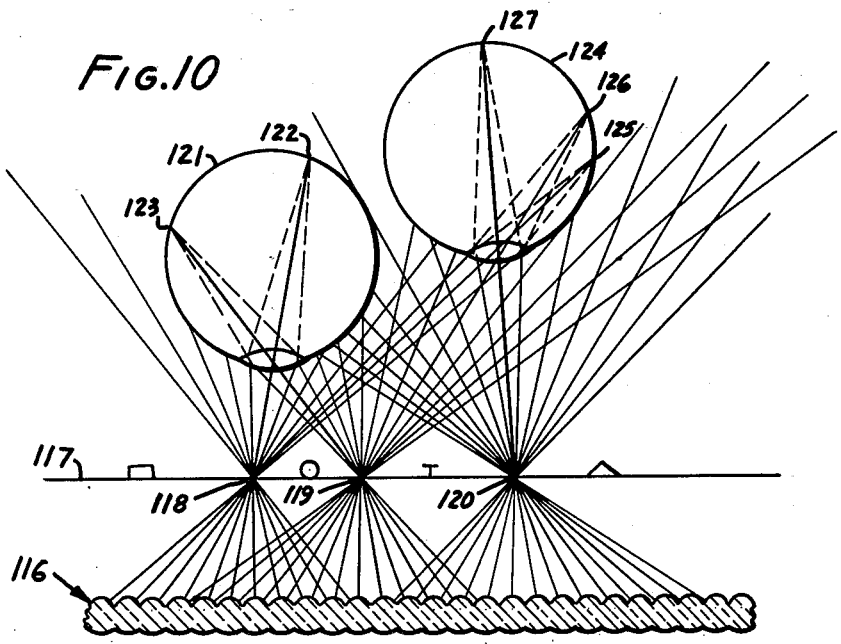

FIGS. 9 and 10 are additional demonstrations of the ability of the above plates to form an image in space. In FIG. 9, an object plane 100 is shown with three objects denoted by points 101, 102, 103, the points being selected at random. Each of these points emits a bundle of rays 104, 105, 106, respectively. These diverging bundles of rays continue on indefinitely unless intercepted. Now consider what is viewed by a human eye looking at these objects. Two eyes 107, 108 are shown. These eyes have apertures (pupils) 109, 110, respectively. With respect to eye 107, exemplary rays from points 101 and 102 are shown being focused at points 111, 112 on the retina of the eye. Rays emanating from point 103 are outside the field of eye 107, not being admitted by the pupil. Eye 108, which is at a different position relative to the points is shown intercepting rays from points 101, 102, and 103 which are focused at points 113, 114, 115, respectively. FIG. 9 merely illustrates the well known action of the human eye in intercepting portions of bundles of rays emanating from objects in an object plane and focusing them on the retina.

FIG. 10 illustrates the substitution of a plate 116 similar to plate 65 in place of an actual model, such as shown by numeral 100 in FIG. 9. Plate 116 is back-illuminated, and provides rays from the various cells in the manner illustrated in FIG. 6. These rays are focused in a plane 117. Three points 118, 119, 120 have been selected at random. Rays from the plate converge to these points from the side of the plane facing the plate. They diverge from the other side. Their divergence is exactly the same as that of the real objects in FIG. 9. Eye 121 is shown focusing rays from point 118 at point 122, and rays from point 119 at point 123. Eye 124 is shown focusing rays from point 118 at point 125, from point 119 at point 126, and from point 120 at point 127.

It will be noted from FIG. 10 that each image point in what was originally the object plane relative to the plate, has an array of rays radiating from it exactly as did the real object in FIG. 9. It can be deduced, therefore, that an eye or lens system that includes an aperture will act in this field no way differently than it does in the radiation field of a real object. Plates 65 are therefore a fully competent substitute for an original real object, and once the plates are made up, the original objects, such as models, are no longer necessary, and can be dispensed with entirely.

There is one significant difference between the bundle of rays provided by plates, such as plate 65, and by a real object. In a real object, the radiation field is everywhere continuous. In contrast, the radiation field from plates 65 for any given position is, instead of a continuous field, made up of discrete bundles of rays between which there is darkness. It therefore follows that in order for a continuous image to be generated from plates 65, the viewing aperture must be of such size that it could span the centers of at least two adjacent bundles from each image point. If this condition is not met, a half-tone effect similar to that used in printing will be produced. For example, if the eye is used to observe the plate, the cell needs to be generally equal to or smaller than the pupil of the eye. For use with an optical system, the aperture of the objective must be at least as large as the chosen cell diameter. As the viewing altitude increases, the aperture ought to be larger.

In summary, the foregoing discussion establishes these facts: (a) a three-dimensional image can be created in space with plates, such as plate 65, which carries a substantial part of the intelligence that could be derived by the use of a real non-planar object; (b) all the intelligence for the above can be contained on a surface which is substantially flat; and (c) the three-dimensional image can be used as an object for a viewing and projection system in order to produce a visual display for a landing scene or equivalent.

In effect, the final image is assembled by the optical system from a multitude of small, individual components (bundles of rays), as contrasted to the formation of an image by the interception and focusing of portions of a continuous field.

Figure 11:
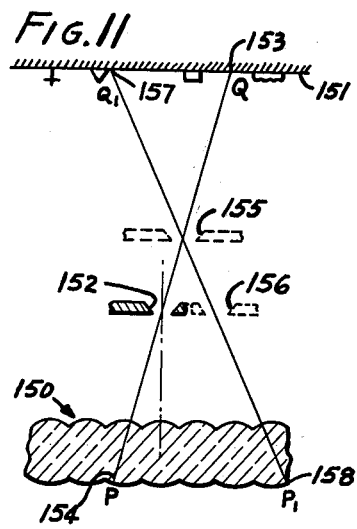
FIGS. 11, 12 and 13 are side elevations showing additional characteristics of image storage plates according to the invention.

It will now be demonstrated how a plate of the type shown in FIG. 6 can be utilized to provide a realistic reproduction of altitude variation. In FIG. 11, a plate 150 has had photographed upon its image storage elements data corresponding to objects in an object plane 151. As stated above, with the use of apertures of appropriate size, the plate will reconstitute the images in the object plane.

Now consider an aperature 152 placed at the same distance from the plate at which the photographic aperture was placed when recording the data on the plate in the first place. A ray QP is drawn from a point 153 in the image plane to a point 154 on one of the image storage elements. It will be appreciated that an aperture 155 disposed at a greater distance from the plate than aperture 152 and displaced laterally to one side thereof, will also pass the ray QP between points 153 and 154.

Now consider the action of a third aperture 156 which is disposed at the same distance from the plate as aperture 152, and consider a ray $Q_1P_1$ connecting points 157 and 158 in the object plane and plate, respectively. Aperture 156 passes this ray and so does aperture 155.

From the above, it can be seen that any ray that passes through aperture 155 (the farther aperture from the plate) can be identified as one which might have been admitted by an aperture at a lower level. Since the entire assemblage of rays could have passed through the lower apertures at a theoretically infinite number of lateral positions, it follows that an aperture at a higher level will admit a full complement of rays for forming a continuous image. However, the rays which pass through aperture 155 are only those which are associated with the higher level; all others are rejected. Therefore, the aspect of the scene presented by rays passed through aperture 155 is exactly that which would be observed from that level. Therefore, the plate provides not only a reconstituted image generally, but also a plate from which the image may be selected in the aspect which would be provided at a selected altitude relative thereto.

Thus, to obtain a change in aspect of the scene to represent a gain or loss in altitude, it is only necessary to raise or lower the aperture (objective lens) of the system. A means for carrying this out is indicated schematically in FIG. 2, wherein a linkage 160 is shown connecting control stick 19 to an altitude servo 161 so that forward and backward movement of the stick, which corresponds to climb and dive, operates on servo 161 to rotate a screw 162 that is engaged to a rack 163 attached to the telescoping portion of the tube in which the objective lens is mounted. This linkage may include an integrating device which correlates the actual up and down movement of the objective lens not only to the position of the control stick, but also to the throttle position, or some other means proportional to air speed. Such means form no part of the optical system, and, being conventional in nature, are not described in further detail here.

Figure 8:
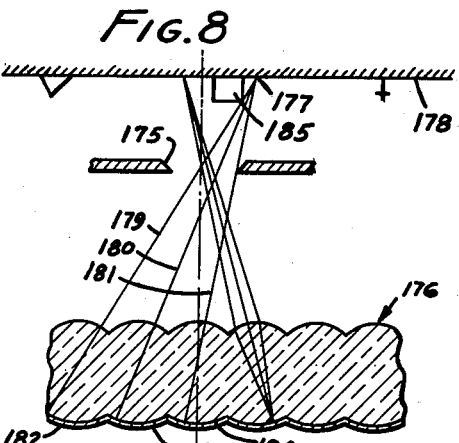
FIG. 8 is a side elevation, partly in cross-section, illustrating a characteristic of the image storage plate of FIG. 6.

FIG. 8 illustrates how lateral motion of an aperture 175 provides a scene of changing aspect. A plate 176 is shown which is like plate 65. Note point 177 in object plane 178. Three rays 179, 180, 181 are shown, which are principal rays of cells 182, 183, and 184, respectively. At the present position of the aperture, point 177 receives all three rays. However, the ray from cell 182 carries the image of the relief object 185, and not of point 177. The effect is to produce a ghost image of the edge of the relief object. As the aperture is moved to the left in FIG. 8, ray 181 is blocked off, and a new ray will be admitted, which produces a ghost image in a different position. As new rays are admitted at the left side of the aperture from different positions on the image storage element surfaces, and other rays are progressively cut off at the right edge, the aspect changes gradually. The formation of ghost images is no worse than that observed in motion pictures which portray rapid motion. If the relative change from cell to cell is kept small, the over-all effect is as good as a movie.

Good results can be had by making the plates of plexiglass about 3 feet square, and about ¾ inch thick. This plate can depict an area about 1,000 feet long and wide, from an altitude of about 10 feet. For an excursion area 1,000 feet wide by 6 miles long, 30 plates are required. The width of the excursion range can be increased in multiples of 1,000 feet by adding duplicate stacks of plates. Each of these stacks occupies a volume of about a three foot cube.

At higher altitudes, the scale factor can be made to increase proportionally, so that at 100 feet altitude, each plate can represent an area 10,000 feet square. At 1,000 feet altitude, the scene stored represents 19 miles square.

On these stacks a cell size approximately ½ inch in diameter is about right, there being about 5,500 cells on a standard 3 foot square plate.

Figure 12:
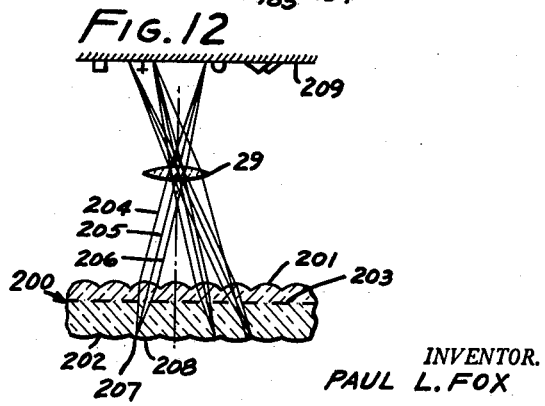

FIG. 12 illustrates an alternate embodiment of image storage plate. Plate 200 has lens elements 201, image storage elements 202 and an aperture plate 203, as does plate 65. The difference between plates 65 and 200 is that the rays of the former are focused to points by the lens surfaces, while in the latter, the rays are collimated. Rays 204, 205, and 206 are shown emanating from point 207 on image storage element 208. These rays, instead of converging as do rays from plate 65, proceed parallel until intercepted by objective lens 29. The system shown in FIG. 12 is therefore auto-focusing, the relationship between rays in a given bundle of rays being independent of the distance from the plate. This is a considerable advantage in the designing of the objective lens.

The formation of images in object plane 209 by the combination of plate 200 and the objective lens is the same as that of plate 65 and its associated aperture. Therefore, the data storing properties and the ability to reconstitute an image are identical for both plates.

Figure 13:
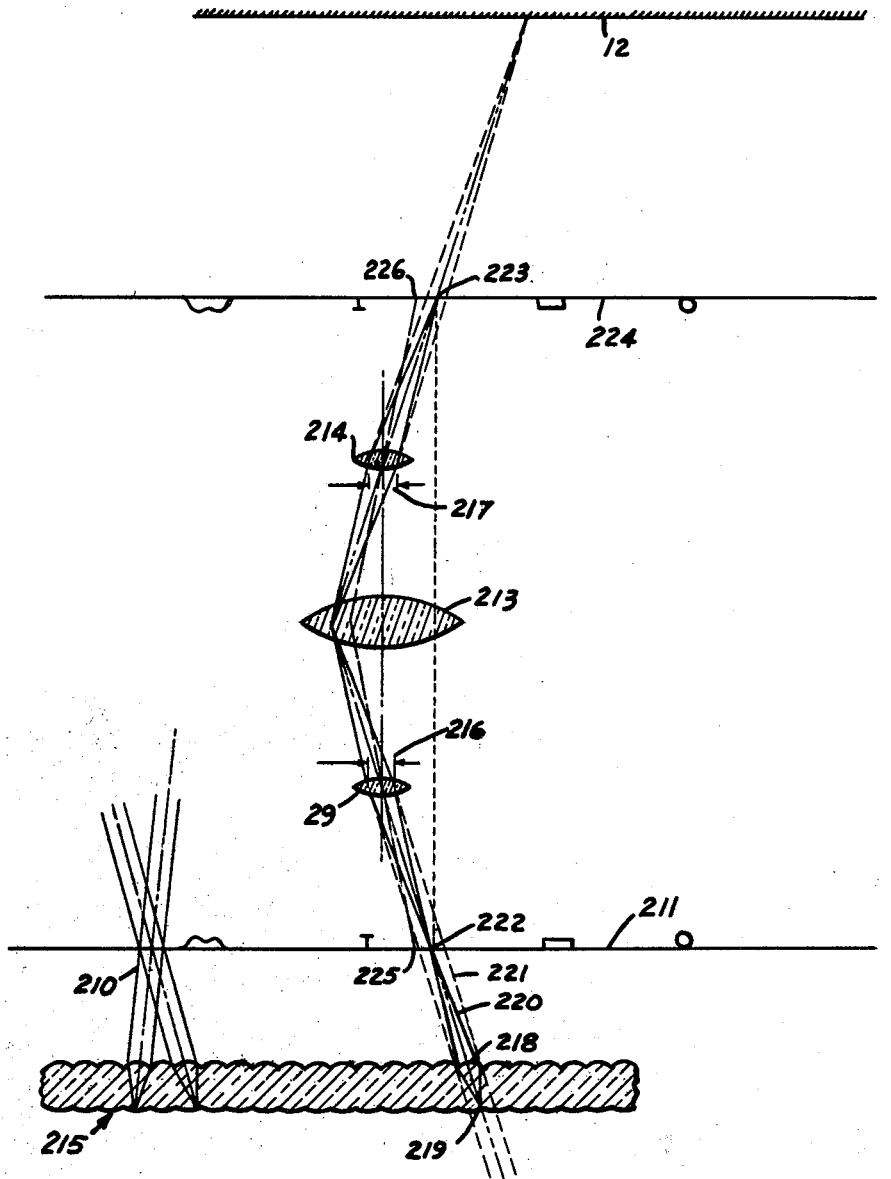

A collimated beam for each image point is created by making the image storage element of such a shape that it is coincident with the focal surface of its respective lens element. This puts the image points from each cell at infinity. The convergence points of the rays from the several cells will still be located along the object plane. This situation is indicated in FIG. 13 by intersecting rays 210 which meet in object plane 211. It is evident from FIG. 13 that the objective 29 will always focus the collimated beams it sees on a field lens 213 regardless of the distance between the plate and the objective, the spacing between the field lens and the object remaining constant. Thus, the system is auto-focusing.

FIG. 13 illustrates the action of a simple projection system for projecting the image provided by the plates onto the screen. It will be understood that the projection components may be placed at any suitable location in the tube above the objective lens 29 and in the horizontal tube 36 (FIG. 1). In the schematic notation of FIG. 13, the objective lens 29, field lens 213 and projection lens 214 are represented as double convex lenses, although they may comprise several groups of lenses of all kinds. The field lens represents the entire relay system.

A plate 215 is shown. This plate may be either like plate 65, or like plate 200, depending on whether the plate is to provide converging rays or collimated rays for producing an image. Apertures 216 and 217 are shown adjacent to the objective and projection lenses, respectively.

Cell 218 is shown emitting rays from point 219. The solid line rays 220 illustrate rays which would be emitted by plate 65, which provides converging rays. The dotted line rays 221 illustrate rays which would be emitted by plate 200, which are collimated. Lens 29 is selected to be appropriate to the type of plate actually used. The optical system beyond the objective lens is the same whichever type of plate is used.

Consider rays 220, which form an image at point 222 in object plane 211. From the symmetry of the system, it is evident that it will be reimaged at point 223 in plane 224. Also, points 222 and 224 will remain stationary while the optical system comprising lenses 29, 213 and 214 is moved laterally relative to the plate. Also, the spacing between points 222 and 225 in plane 211 and between points 223 and 226 in plane 224 remains constant. Thus, the optical system shown can scan the entire field in plane 211 and reproduce it exactly in plane 224.

In addition, if both planes 211 and 224 are moved away from their respective apertures by equal amounts, and a focal adjustment is made in lenses 29 and 214, the symmetry of the system is preserved and the stationary aspect of points in plane 224 continues to exist, while the altitude aspect has been changed.

By similar logic, point 222 in plane 211 may be considered to exist at infinity, with the objective adjusted to focus the collimated light from a point at infinity to the field lens, without change in the net system action.

Rays 225 show the image projected onto screen 12. (The curvature of FIG. 12, which is small for the small area shown in FIG. 13, is ignored for the sake of illustration.) It is evident that the image formed on the screen has the same properties as that formed in plane 224.

Actually, for an observer at the aperture of the projection lens (see also FIG. 2), the distance to the screen is of no significance, since he will see a typical point such as point 223 in the same aspect whether it is focused in plane 224 or on screen 12. There is not need for either moving the screen or adjusting the projection lens focus to preserve the angular symmetry of the system. Note in FIGS. 1 and 2 that aperture 216 is very close to the head of the observer, and that the Fresnel lens corrects for parallax error, so that for all practical purposes the observer is at the aperture of the projection lens.

It is desirable for the scene to be projected onto the screen with a field angle of about 200°. This is possible for the projection lens, but the field angle of the plate cells ought to be less than about 70°. For this purpose, a field compressor-expander combination may be interposed in the system; first in the camera when placing the images on the cells, and then in the projection system. It is subject to demonstration that all of the above actions and features of the device are retained when a field compressor-expander is used.

The system is useful without the compressor-expander, but practical considerations reduce its field, and thereby subtracts from its overall effect. The image is cast downward in FIG. 1, its attitude being controlled by the various elements already described. The pilot capsule casts a shadow, of course, but only in areas not visible to the trainee anyway. Apart from that shaded region, the entire horizon has an image, all the way around the capsule. This provides a very effective simulation of the surroundings, and a compressor-expander is therefore merited. However, there are situations wherein only a lesser field is needed, and in those cases it may be deleted without loss of effect.

As it happens, the scenes are displayed by the illustrated device in bas relief, because, whereas the plate "saw" the tops of objects when exposed thereto, the image formed by the plate is obtained by the objective lens from the reverse side of the object plane. In situations where this effect is objectionable, it may be corrected by placing in the system a semi-reflecting mirror which reflects a portion of the rays to a concave mirror, which gives a suitable reversal of points, and reflects the rays back to the semi-reflecting mirror, where part are transmitted and part are reflected, the part transmitted after reflection from the concave mirror being used for projection of the image, in which case the images will be convex, and not concave in bas relief.

FIG. 14 shows one means of moving the plates under the objective lens so that the image of a scene simulating a position of the trainee at some location in the system is formed. The downwardly projected position of objective lens 29 is shown in dotted line.

Storage units 23 and 28 are shown, unit 23 having a pivoted biasing arm 300 which maintains a force on the edge of the top plate in the stack which tends to move the plate onto a central slide 301. The arm is shown pressing on plate 302, which in turn bears on plate 303. Other plates 304, 305, 306, and 307 are also shown. Plate 307 is entering unit 28 for storage.

The plates have racks 309 on their edges for engagement by pinions 310. Pinions 310 mesh with idler gears 311. The left-hand end pinions have pulleys 312. A belt 313 wraps around each pulley 312 and a spool 314, so that the belt makes an angle $\theta$ with forward axis 315. The diameter of the pulley bears the relation to their respective pinions such that the lineal speed of the belt is equal to the linear speed of the pinion periphery (that is, the lineal speed of plates 304 and 305) multiplied by the secant of angle $\theta$.

Pinions 310 are linked to a motor 316. Motor 316 is controlled by a forward speed servo 317 which is controlled by throttle setting 20. The higher the speed represented by the throttle setting, the faster is motor 316 operated. Pinions 310 act as the primary control over the rate of movement of the plates past the objective, and this simulates speed.

Slide 301 is mounted to shift laterally in the lateral directions shown by arrow 318. A chain drive 319 is shown connected to the slide and engaged to a motor 320 controlled by a lateral servo 321. The lateral servo is controlled by the rudder bar. Movement of the rudder bar causes the slide to move laterally, and thereby shifts the plates sidewardly under the objective lens so as to provide a changing aspect of the scene appropriate to a new course heading. The illusion of heading in the vector direction is provided by the connection of the rudder bar with K mirror 37 shown in FIG. 3.

The belts assure that plates, such as plate 303, are kept smoothly bearing against plates, such as plate 304, which are engaged by the pinions.

A similar set of belts 322 in unit 28 guide plates into storage. This handling system assures that, regardless of the lateral position of the slide, new plates are always available to be engaged by the pinions.

The control of the stick on the altitude servo and universally mounted mirror attend to simulation of altitude change, roll and pitch. The control of the rudder bar on K mirror 37 and lateral servo 321 attend to simulation of heading and lateral displacement. The control of throttle 20 on the forward speed servo 317 attends to simulation of forward displacement. Thus, these simple controls provide all necessary means for selecting and projecting an image in an attitude and aspect relative to an observer which completely simulates his position in a system. Of course, more sophisticated servos may be provided, such as for the purpose of simulating wind drift, and the like, but they form no part of this invention, and will not be described here.

The operation of the system should be evident from what has been said above. It provides a completely unprogrammed display, and is of wide utility in simulating the surroundings of an observer.

This invention is not to be limited by the embodiments shown in the drawings and described in the description, which are given by way of example, and not of limitation, but only in accordance with the scope of the appended claims.

What is claimed is:

1. A method of storing an image of an object on an image storage device, which device comprises a plate of transparent material, said plate having a first surface substantially covered by a plurality of lens elements, each of said lens elements having a linear central axis and a surface which is convex on both sides of said axis in every plane which includes said central axis, each of said lenses having the property of converging the rays of beams which impinge thereon, and a second surface substantially covered by a plurality of image storage elements, each image storage element having a central axis, each lens element having an image storage element axially aligned therewith, the surface of the image storage element being coincident with the focus of the lens element, the image storage elements being adapted to receive and retain in visible form an image of an object formed by its respective lens element, the image on each image storage element being of an incrementally different aspect of the object from its neighboring image storage element, said differing aspects being those seen axially by the respective lens elements at an incrementally different lateral location relative to the object from its neighboring lens element, said method comprising coating the image storage elements with a light-sensitive composition, positioning an objective lens over and in alignment with the axis of a first of said lens elements, and with said objective lens projecting an image of the object upon the first and only the first of said lens elements, so that the image is cast upon the respective data element to record said image upon the respective image storage element, thereafter, moving the objective lens relatively to the object and plate while keeping the object and plate relatively fixed in space, to a position where the objective lens is axially aligned with a second lens element and then projecting an image of the object upon only the second lens element, and successively performing said acts upon a third and all other of said lens elements performing this operation on the individual lens elements of the plate, one by one, by positioning axes of the objective lens individually over each of the individual lens elements and projecting the image on each individual lens element while in axial coincidence therewith, and then developing the light-sensitive composition to provide visual images on the image storage elements of the images projected on them by the objective lens.

2. A visual training device comprising: a plurality of plates of transparent material, each of said plates having a first surface substantially covered by a plurality of lens elements, each of said lens elements having a linear central axis and a surface which is convex on both sides of said axis in every plane which includes said central axis each of said lenses having the property of converging the rays of beams which impinge thereon, and a second surface substantially covered by a plurality of image storage elements, each image storage element having a central axis, each lens element having an image storage element axially aligned therewith, the surface of the image storage element being coincident with the focus of its respective lens element, the image storage elements being adapted to receive and retain in visible form an image of an object formed by its respective lens element, the image on each image storage element being of an incrementally different aspect of the object from its neighboring image storage element, said different aspects being those seen axially by the respective lens elements at an incrementally different lateral location relative to the object from its neighboring lens element; a vertically directed objective lens including an aperture spaced from one of said plates and facing toward its lens elements; handling means for successively moving said plates in a horizontal plane forwardly across a surface relative to the aperture at a rate and in a lateral position relative to the forward direction corresponding to a simulated velocity and location of an observer in space relative to the object, whereby said aperture intersects a cone of rays from all lens elements within the field of the objective lens as limited by said aperture, thereby to receive a real synthesized image from the plate over which the aperture is positioned; a substantially spherical screen; a pilot station within the screen; a projection system for casting said image on the screen, which projection system includes a horizontal portion, a downward leg, said downward leg lying within the screen, and a wide-angle projection lens directed vertically downward so as to cast its image around a full horizon; a universal control stick at the pilot station for simulating the control of an aircraft in roll, pitch, and altitude; a rudder bar at the pilot station for simulating the control of an aircraft heading; a throttle member at the pilot station for simulating the control of aircraft velocity, a first motor in driving engagement with the plate under the objective lens for moving the plate under the objective lens in a direction to simulate forward motion; servo means connected to said first motor and throttle member to operate the first motor at a rate proportional to a simulated velocity; image tilting means in the projection system, said image tilting means comprising a universally tiltable mirror linked to the control stick so as to respond to universal movement of the stick, the mirror tilting around an axis lateral to the observer when the stick is moved forwardly or rearwardly, and tilting around a forwardly extending axis when the stick is moved from side to side; and image rotating means in the projection system, said image rotating means comprising a plural reflection device of the class which reflects an incident ray in the incident direction of the ray without deflection or displacement, but rotates the ray around said direction when the means are rotated, said means being connected to the rudder bar so as to rotate when the rudder bar is rotated, thereby rotating the image around its horizon as projected on the screen; a second motor connected to the objective lens and aperture for moving the same toward and away from the plate, altitude servo means connected to the second motor and to the control stick so as to respond to forward and backward movement of the control stick and thereby control the motor to move the objective lens and aperture to an elevation above the plate proportional to a simulated altitude; said handling means including a slide beneath the objective lens, said slide being movable laterally relative to the direction of plate movement corresponding to forward movement, a third motor connected to said slide, a lateral servo connected to said third motor and to the rudder bar so as to shift the plate beneath the objective lens laterally to simulate a lateral change in position.

3. Apparatus according to claim 2 in which the plates are stored in vertical stacks, and in which means are provided for moving the plates sequentially from one stack to the other, so that they pass beneath the objective lens in that movement.

4. Apparatus according to claim 2 in which the screen is covered by curved reflecting surfaces of the type which controllably reflect a beam incident thereon.

5. Apparatus according to claim 4 in which the screen is covered by a plurality of convex reflecting elements, each of which occupies a minor portion of the total screen area.

References Cited in the file of this patent

UNITED STATES PATENTS

| | | |
|---|---|---|
| 1,918,705 | Ives | July 18, 1933 |
| 1,992,608 | Deninson | Feb. 26, 1935 |
| 2,174,003 | Ives | Sept. 26, 1939 |
| 2,287,145 | Stephen et al. | June 23, 1942 |
| 2,350,351 | Grunberg | June 6, 1944 |
| 2,591,752 | Wicklund | Apr. 8, 1952 |
| 2,689,502 | Ayres | Sept. 21, 1954 |
| 2,950,644 | Land et al. | Aug. 30, 1960 |

FOREIGN PATENTS

| | | |
|---|---|---|
| 561,769 | Canada | Aug. 12, 1958 |